United States Patent
Chang et al.

(10) Patent No.: US 7,034,252 B2
(45) Date of Patent: Apr. 25, 2006

(54) HAND-HELD ELECTRIC HEAT SEALER

(75) Inventors: Richard Chang, Taipei Hsien (TW); Ammy Chou, Taipei Hsien (TW)

(73) Assignee: Welcome Co., Ltd., Taipei Hsien (TW)

( * ) Notice: Subject to any disclaimer, the term of this patent is extended or adjusted under 35 U.S.C. 154(b) by 1015 days.

(21) Appl. No.: 09/739,990

(22) Filed: Dec. 18, 2000

(65) Prior Publication Data

US 2001/0000608 A1    May 3, 2001

Related U.S. Application Data

(63) Continuation of application No. 09/208,256, filed on Dec. 9, 1998, now Pat. No. 6,326,594, which is a continuation-in-part of application No. 09/132,687, filed on Aug. 12, 1998, now Pat. No. 6,064,038, and a continuation-in-part of application No. 09/189,359, filed on Nov. 9, 1998, now Pat. No. 6,232,579, which is a continuation-in-part of application No. 08/917,358, filed on Aug. 26, 1997, now Pat. No. 5,854,466.

(51) Int. Cl.
*H05B 1/00* (2006.01)
*H05B 3/02* (2006.01)

(52) U.S. Cl. ............ 219/243; 219/227; 219/229; 156/579

(58) Field of Classification Search ............ 219/243, 219/227, 524, 229, 544, 228–230, 221, 240–241, 219/535, 233; 156/579, 515, 583.1, 379.6, 156/499

See application file for complete search history.

(56) References Cited

U.S. PATENT DOCUMENTS

| RE8,282 E | 6/1878 | Eaton |
| 1,083,386 A | 1/1914 | Chapman |
| 1,656,690 A | 1/1928 | Blackburn |
| 1,850,280 A | 3/1932 | Haynes |
| 2,371,438 A | 3/1945 | Gilliver ........................ 219/4 |
| 2,465,722 A | 3/1949 | Hamilton .................... 173/273 |
| 2,535,171 A | 12/1950 | Sunstrom .................... 154/42 |
| 2,610,137 A | 9/1952 | Williamson ................. 154/42 |
| 2,669,642 A | 2/1954 | Menges ....................... 219/21 |
| 2,974,717 A | 3/1961 | Lindsay ....................... 154/42 |
| 3,106,630 A | 10/1963 | Klamp ........................ 219/19 |
| 3,319,047 A | 5/1967 | Jones, Jr. et al. .......... 219/388 |
| 3,322,603 A | 5/1967 | Grasso ....................... 156/579 |
| 3,381,450 A | 5/1968 | Monks ........................ 53/390 |
| 3,408,478 A | 10/1968 | Penn ......................... 219/229 |
| 3,624,349 A | 11/1971 | Mayer ....................... 219/243 |
| 3,660,959 A | 5/1972 | La Fleur ..................... 53/14 |
| 3,731,054 A | 5/1973 | Bair .......................... 219/243 |
| 3,752,017 A | 8/1973 | Lloyd et al. ............... 81/9.5 B |
| 3,822,164 A | 7/1974 | Guido et al. ............... 156/358 |

(Continued)

FOREIGN PATENT DOCUMENTS

FR           969.962       12/1950       ........................ 5/5

(Continued)

*Primary Examiner*—Quang Van
(74) *Attorney, Agent, or Firm*—Jeffer, Mangels, Butler & Marmaro LLP

(57) ABSTRACT

A hand-held electric sealer used for sealing a plastic bag or the like, including a casing, a sealing mechanism, a press bar, and a safety device. The sealing mechanism has a heating wire, which produces heat for sealing the plastic bag or the like when turned on. The safety device controls the heating of the sealing mechanism, and stops the sealing mechanism from being triggered accidentally.

1 Claim, 18 Drawing Sheets

U.S. PATENT DOCUMENTS

| | | | |
|---|---|---|---|
| 3,912,575 A | 10/1975 | Zelnick | 156/515 |
| 3,962,017 A | 6/1976 | Wyse | 156/306 |
| 4,082,941 A | 4/1978 | Sukow et al. | 219/243 |
| 4,093,500 A | 6/1978 | Browne | 156/510 |
| 4,212,311 A | 7/1980 | Del Valle | 132/31 A |
| 4,213,460 A | 7/1980 | Weiner | 219/201 |
| 4,247,753 A | 1/1981 | Jaronen | 219/201 |
| 4,438,323 A | 3/1984 | Millnes | 219/243 |
| D277,386 S | 1/1985 | Yamada | D15/146 |
| 4,561,925 A | 12/1985 | Skerjance et al. | 156/379.6 |
| D328,750 S | 8/1992 | Chou | D15/146 |
| 5,142,123 A | 8/1992 | Chou | 219/243 |
| 5,352,323 A | 10/1994 | Chi | 156/583.9 |
| 5,374,806 A | 12/1994 | Chou | 219/229 |
| 5,641,418 A | 6/1997 | Chou | 219/229 |

FOREIGN PATENT DOCUMENTS

| | | | |
|---|---|---|---|
| JP | 2000118516 | * | 4/2000 |
| NL | 542359 | | 8/1959 |
| TW | 040687 | | 4/1988 |
| TW | 75203282 | | 7/1988 |

* cited by examiner

HAND-HELD ELECTRIC HEAT SEALER

This is a continuation of application Ser. No. 09/208,256, filed on Dec. 9, 1998 now U.S. Pat. No. 6,326,594 which is a continuation-in-part of application Ser. No. 09/132,687, filed Aug. 12, 1998, now U.S. Pat. No. 6,064,038 and Ser. No. 09/189,359, filed Nov. 9, 1998 now U.S. Pat. No. 6,232,579 both of which are continuations-in-part of application Ser. No. 08/917,358 filed on Aug. 26, 1997, now U.S. Pat. No. 5,854,466, all of which are incorporated by reference in their entireties herein.

BACKGROUND OF THE INVENTION

The present invention relates to electric sealers, and more particularly to a hand-held electric sealer with safety means which controls the heating of the sealing mechanism, and stops the sealing mechanism from being triggered by an erroneous action.

A variety of electric sealers have been developed, and have appeared on the market. These conventional electric sealers are designed to be energized by AC power supply, or DC power supply. U.S. Pat. No. 5,142,123 discloses an electric an electric sealer energizable by internal battery set or external AC adapter.

SUMMARY OF THE INVENTION

It is one object of the present invention to provide an electric sealer which is hand-held and safe to use. It is another object of the present invention to provide an electric sealer which is energizable by an internal battery set or external AC adapter. It is still another object of the present invention to provide a hand-held electric sealer which includes means to stop the sealing mechanism from being triggered by an erroneous action.

According to one embodiment of the present invention, the hand-held electric sealer comprises a casing, a sealing mechanism, a press bar, and safety means. The sealing mechanism comprises a heat insulative base, a heating wire, and two metal locating plates. The heat insulative base has a projecting block on the middle. The heating wire is mounted on the projecting block of the heat insulative base. The metal locating plates are fastened to the heat insulative base at two opposite sides to hold down the heating wire. A heat resistive cover sheet may be fastened to the projecting block of the heat insulative base, and covered on the heating wire. The number of the heating wire may be increased if desired. The heat insulative base of the sealing mechanism can be made of ceramics, bakelite, heat insulative plastics, or any material that resists heat as high as about 200° C. The press bar has one end, namely the fixed end, pivotably connected to the casing, and an opposite end, namely the free end, mounted with a heat insulative block. When the press bar is pressed down, the heat insulative block is lowered with the free end of the press bar and forced against the heat insulative base of the sealing mechanism to clamp the mouth of the plastic bag, enabling the mouth of the plastic bag to sealed. The safety means controls the heating of the heating wire of the sealing mechanism, and stops the sealing mechanism from being triggered by an accident. The safety means can be a stop plate pivotably to the outside wall of the casing, and turned between a first position where the stop plate is suspended above the sealing mechanism to stop the heat insulative block of the press bar from contacting the projecting block of the heat insulative base of the sealing mechanism, and a second position where the stop plate is moved away from the sealing mechanism for enabling the heat insulative block of the press bar to be pressed against the projecting block of the heat insulative base of the sealing mechanism. In an alternate form of the present invention, the safety means comprises a shaft mounted in a hole inside the casing, a stop rod turned about the shaft, and a knob fixedly connected to the stop rod and extended out of a notch on the casing and operated by hand to turn the stop rod about the shaft between a first position where the sealing mechanism is not allowed to be triggered, and a second position where the sealing mechanism is allowed to be triggered. The safety means can be a safety switch, a press-button switch, or an electric connector, or a combination of them. When a press-button switch is used, a protective shielding means is provided for protection. The electric circuit is closed or, opened by operating the safety means of the safety switch, press-button switch or electric connector. In still another alternate form of the present invention, the sealing mechanism is installed in the free end of the press bar.

DETAILED DESCRIPTION OF THE PREFERRED EMBODIMENT

Figure 1:
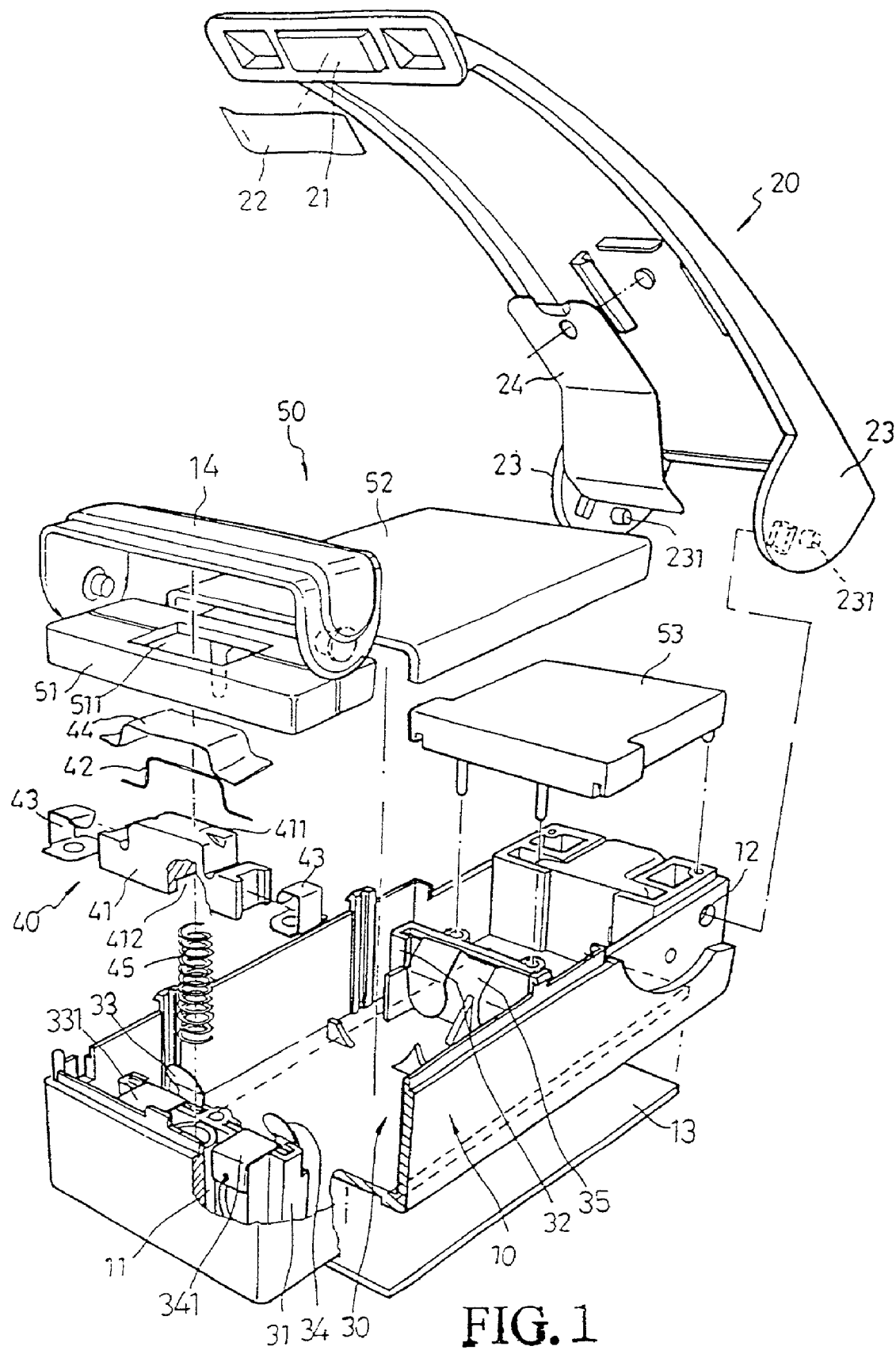
FIG. 1 is an exploded view of a hand-held electric sealer according to a first embodiment of the present invention.
Figure 2:
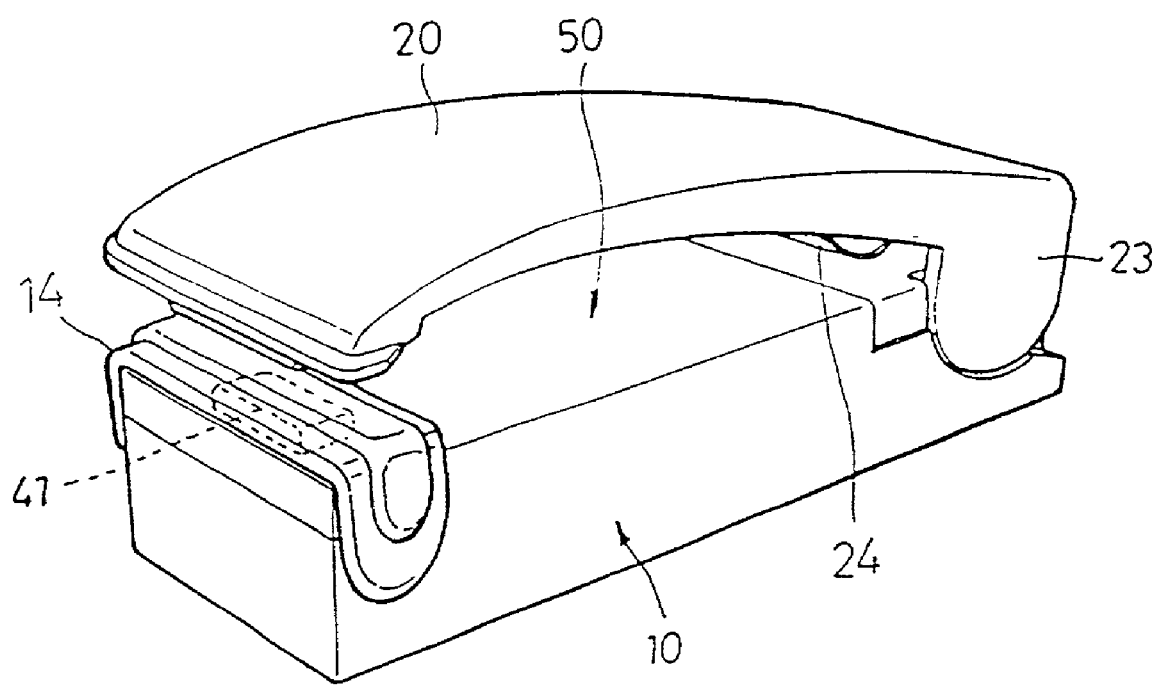
FIG. 2 is a perspective view of the first embodiment of the present invention.

Referring to FIGS. 1–4, a hand-held electric sealer in accordance with a first embodiment of the present invention is an electric sealer energizable by an internal battery set, comprised of a casing 10, a spring holder 11, a press bar 20, a battery chamber 30, and a sealing mechanism 40.

The battery chamber 30 is defined within the casing 10, comprising a front contact holder 31 transversely disposed at a front side, a rear contact holder 32 transversely disposed at a rear side, a pair of first metal contacts 33 and 34, bilaterally provided at the front contact holder 31, a pair of second metal contacts 35 bilaterally provided at the rear contact holder 32, and two horizontal metal contacts 331 and 341 respectively forwardly extended from the first metal contacts 33 and 34. According to this embodiment, the second metal contacts 35 are integral with each other battery set can then be installed in the battery chamber 30 between the front contact holder 31 and the rear contact holder 32 to provide DC power supply to the sealing mechanism 40. The spring holder 11 is mounted in casing 10 between the horizontal metal contacts 331 and 341.

The sealing mechanism 40 is mounted in the casing 10, comprising a heat insulative base 42, a heating wire 42, two metal locating plates 43, a heat resistant cover sheet 44, and a compression spring 45. The heat insulative base 41 comprises a flat projecting block 411 on the middle. The heating wire 42 is fastened to the projecting block 411 of the heat insulative base 41. The locating plates 43 are fastened to the heat insulative base 41 at two opposite sides to hold the heating wire 42 in place. The heat resistant cover sheet 44 is covered on the projecting block 411 and the heating wire 42 to protect the heating wire 42, and to provide a smooth surface. The heat resistant cover sheet 44 can be a meshed member made of teflon-coated metal wire. The heat insulative base 41 further comprises a bottom hole 412. The compression spring 45 has a bottom end mounted in the spring holder 11, and a top end inserted into the bottom hole 412. Therefore, the sealing mechanism 40 is supported on the compression spring 45, and can be moved up and down relative to the casing 10.

The press bar 20 comprises a heat insulative block 21 at the bottom side of one end, namely the front end thereof, a heat resistant cover sheet 22 covered on the heat insulative block 21, and a pair of lugs 23 bilaterally arranged in parallel at an opposite end, namely the rear end thereof. The lugs 23 each have a pivot pin 231. The pivot pins 231 of the lugs 23 are respectively inserted into respective pivot holes 12 at the rear side of the casing 10 remote from the sealing mechanism 40. Therefore, the press bar 20 is coupled to the casing 20, and can be turned up and down about an axis relative to the casing 10. When the press bar 20 is turned downwards, the heat insulative block 21 is pressed on the projecting block 411 of the heat insulative base 41 of the sealing mechanism 40. The heat resistant cover sheet 22 is covered on the heat insulative block 21 to provide a smooth surface. The heat resistant cover sheet 22 can be a meshed member made of teflon-coated metal wire. Further, a spring plate 24 is provided, having a fixed end fastened to the press bar 20 and a free end stopped at a part of the casing 10. The spring plate 24 imparts an upward pressure to the press bar 20, causing the press bar 20 to be maintained in an "opened" position where the heat insulative block 21 is kept away from the projecting block 411 of the heat insulative base 41 of the sealing mechanism 40.

A safety stop plate 14 is pivotably connected to the front side of the casing 10. When the safety heat sealer is not in use, the safety stop plate 14 is turned upwards and forced into the gap between the heat insulative block 21 of the press bar 20 and the projecting block 411 of the heat insulative base 41 of the sealing mechanism 40 to prohibit the heat insulative block 21 of the press bar 20 from contacting the sealing mechanism 40. When in use, the safety stop plate 14 is turned outwards and then downwards, enabling the heat insulative block 21 of the press bar 20 to be pressed against the projecting block 411 of the heat insulative base 41 of the sealing mechanism 40.

A cover 50 is covered on the casing 10 to protect the sealing mechanism 40 and the battery chamber 30. The cover 50 is comprised of a front cover plate 51, which covers the sealing mechanism 40, a battery cover plate 52, which covers the battery chamber 30, and a rear cover plate 53, which covers the rear part of the casing 10. The front cover 51 has an opening 511 through which the projecting block 411 of the heat insulative base 41 of the sealing mechanism 40 passes.

Further, a magnetic mounting plate 13 is fixedly provided at the back side (bottom side) of the casing 10. By means of the magnetic mounting plate 13, the hand-held electric sealer can be secured to a metal object for example the metal wall of a refrigerator by magnetic attraction.

Figure 3:
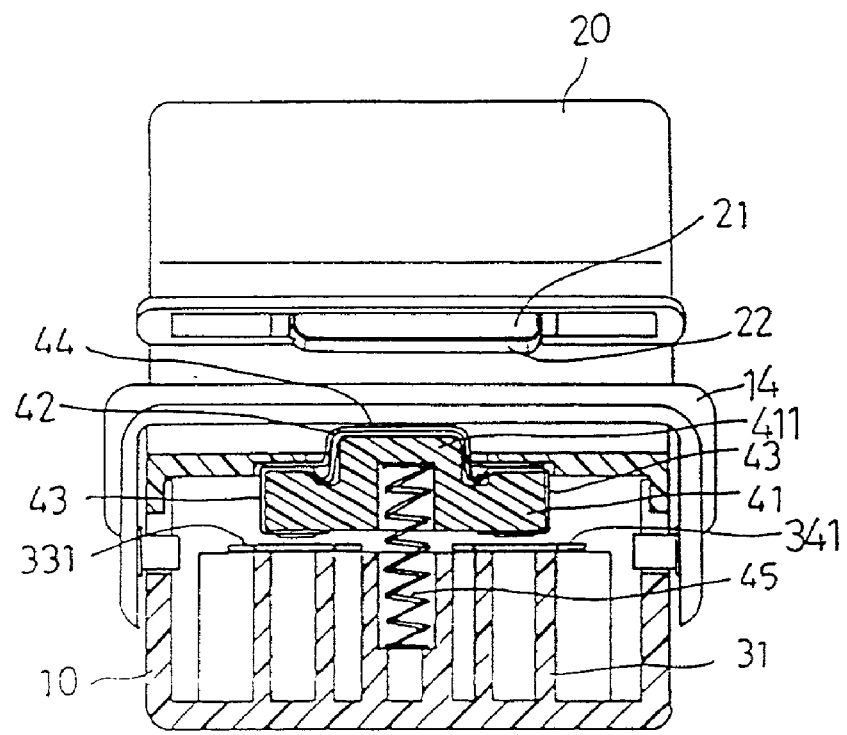
FIG. 3 is a cross sectional view of the first embodiment of the present invention, showing the press bar not depressed.
Figure 4:
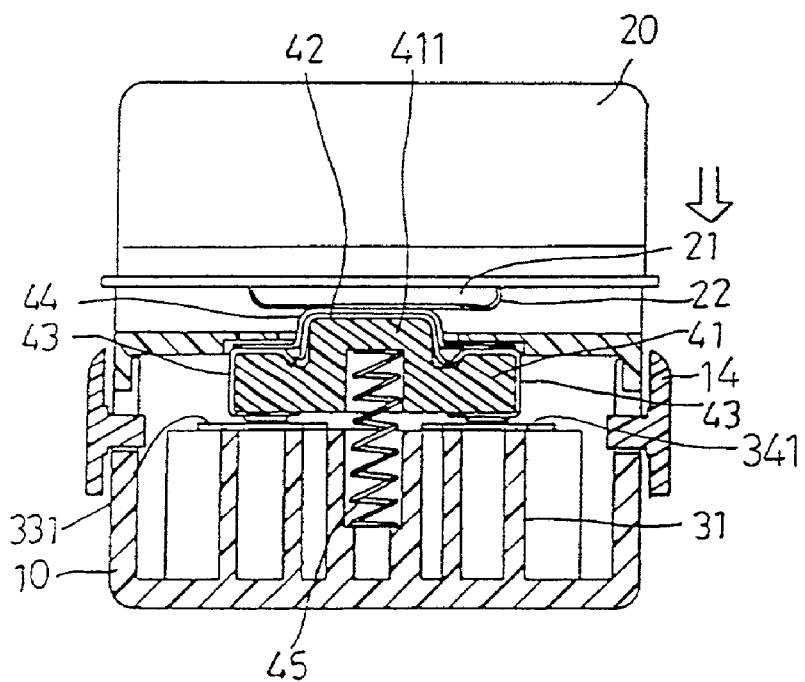
FIG. 4 is similar to FIG. 3 but showing the press bar depressed.

The operation of the first embodiment of the present invention is outlined hereinafter with reference to FIGS. 3 and 4 again. As illustrated in FIG. 3, when the hand-held electric sealer is not operated, the metal locating plates 43 are kept away from the horizontal metal contacts 331 and 341, the heating wire 42 is disconnected from the DC power supply of the battery (which is installed in the battery chamber 30), and the safety stop plate 14 is stopped between the heat insulative block 21 of the press bar 20 and the projecting block 411 of the heat insulative base 41 of the sealing mechanism 40. Therefore, pressing the press bar 20 does not cause the sealing mechanism 40 to work. When in use, as illustrated in FIG. 4, the safety stop plate 14 is turned away from the projecting block 411, then the press bar 20 is depressed to force the heat insulative block 21 against the heat insulative base 41 of the sealing mechanism 40, causing the metal locating plates 43 to be lowered with the heat insulative base 41 into contact with the horizontal metal contacts 331 and 341, and the heating wire 42 is electrically connected to start the heat sealing operation.

When sealing the two thermoplastic flaps of an article, the thermoplastic flaps of the article are placed in between the heat insulative block 21 and the projecting block 411, then the press bar 20 is depressed to force the metal locating plates 43 into contact with the horizontal metal contacts 331 and 341. When the metal locating plates 43 touch the horizontal metal contacts 331 and 341, the heating wire 42 is turned on to produce heat, thereby causing the thermoplastic flaps of the article to be sealed. After sealing, the press bar 20 is released from the hand, enabling the heat insulative base 41 and the metal locating plates 43 to be moved upwardly away from the horizontal metal contacts 331 and 341 by the compression spring 45, and therefore battery power supply is cut off from the heating wire 42.

Figure 5:
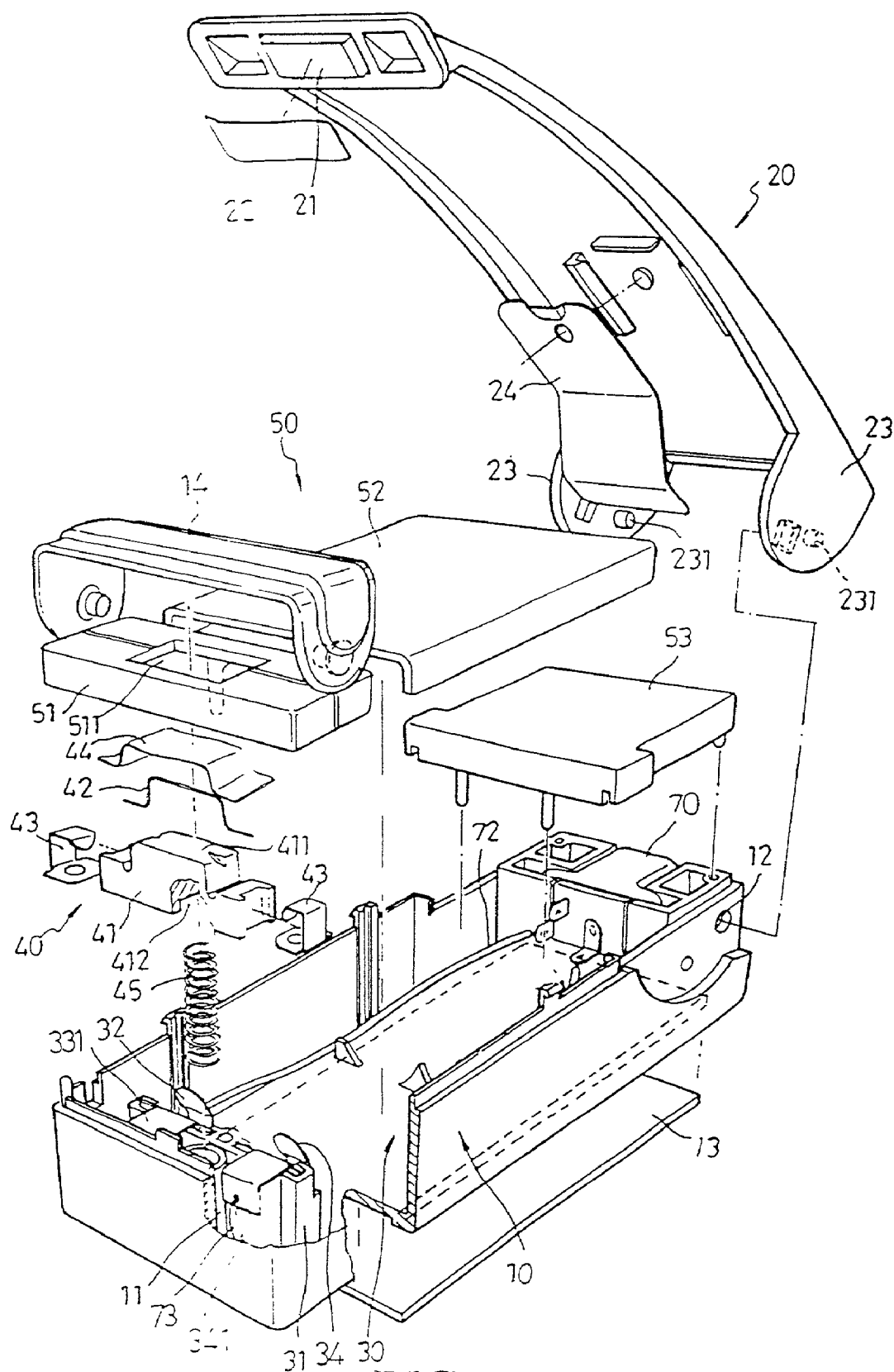
FIG. 5 is an exploded view of a hand-held electric sealer according to a second embodiment of the present invention.

FIG. 5 shows a hand-held electric sealer according to a second embodiment of the present invention. This embodiment is energizable by an external AC adapter. The structure and operation procedure of this second embodiment are similar to that of the aforesaid first embodiment with the exception of the arrangement of power supply. The second embodiment comprises a power socket 70 for receiving power supply from an AC outlet through an AC adapter. The power socket 70 has two opposite terminals respectively connected to the horizontal metal contacts 331 and 341 by electric wires 72 and 73. Because no battery is used, the aforesaid battery chamber can be eliminated from the casing 10. Therefore, the size of the casing 10 can be greatly reduced. Further, the safety stop plate 14 is pivotally connected to the outside wall of the casing 10 relative to the sealing mechanism 40 for safety control.

Figure 6:
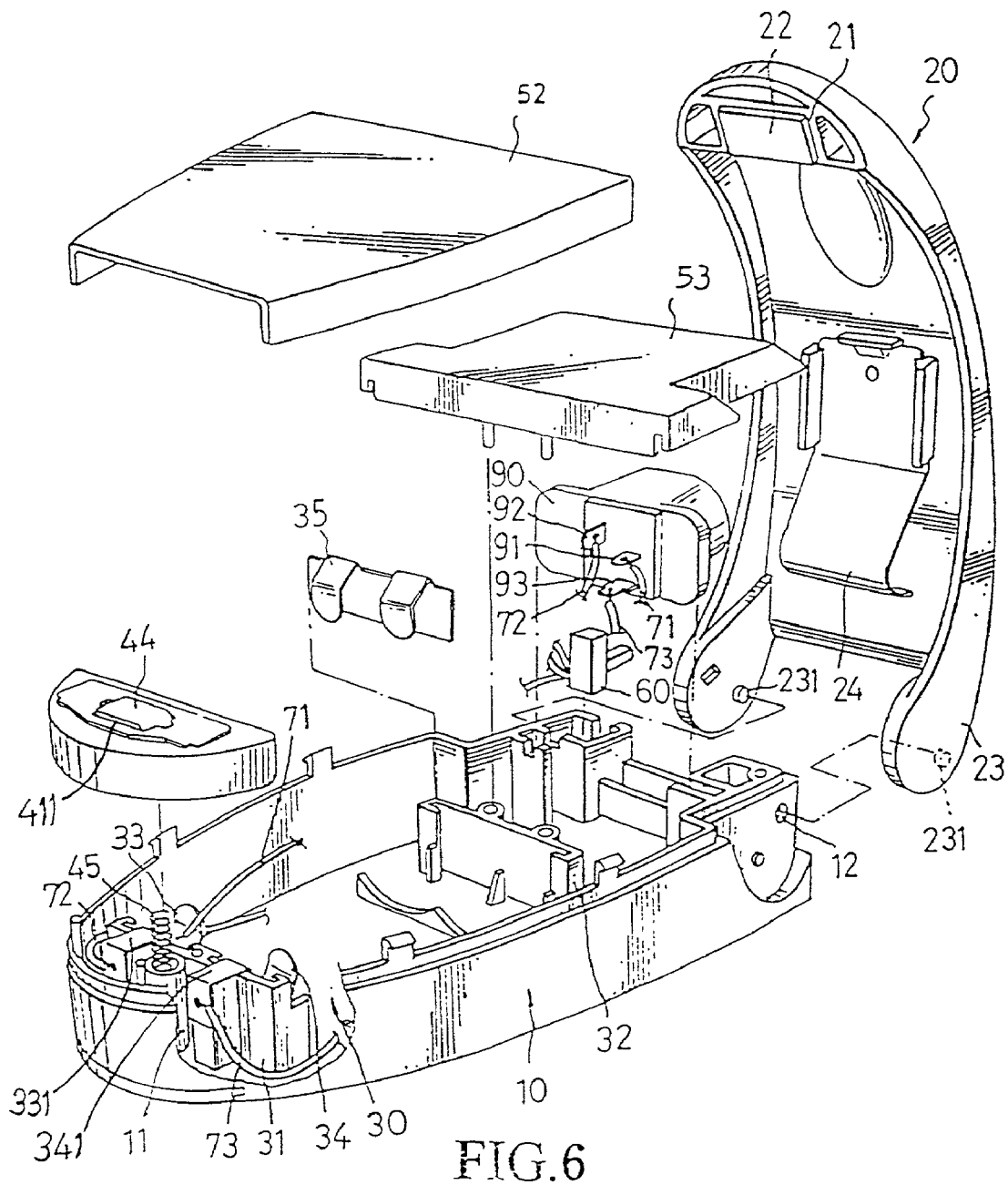
FIG. 6 is an exploded view of a hand-held electric sealer according to a third embodiment of the present invention.
Figure 7:
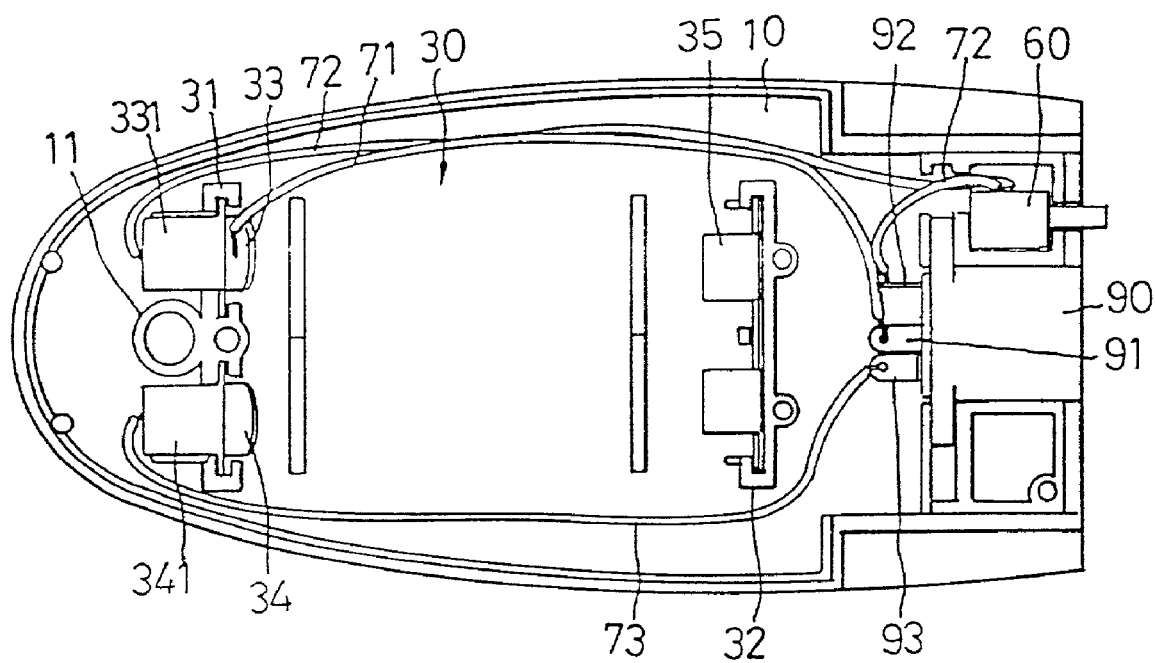
FIG. 7 is a top plain view of the third embodiment of the present invention, showing the arrangement of the electric circuit.
Figure 8:
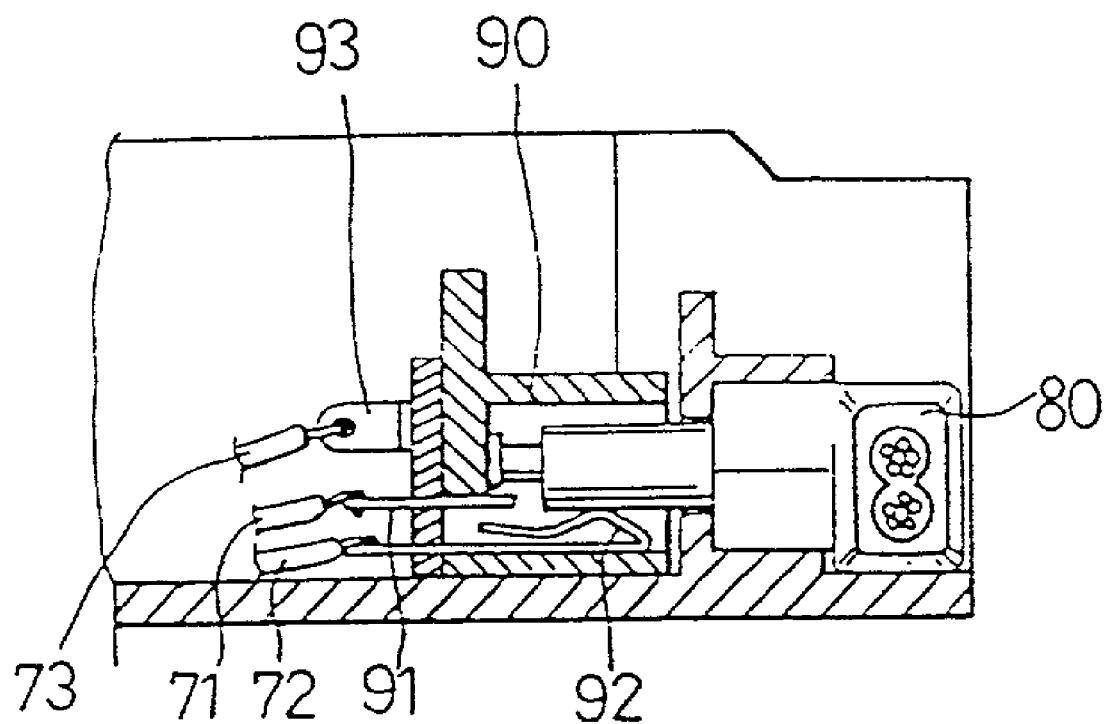
FIG. 8 is a sectional view of a part of the first embodiment of the present invention, showing an AC adapter inserted into the electric connector, the second terminal disconnected from the first terminal.

FIGS. 6 through 8 illustrate a hand-held electric sealer according to a third embodiment. This third embodiment can be energized by an internal battery set or an external AC adapter as desired. The electric connector, referenced by 90, comprises a first terminal 91, a second terminal 92 and a third terminal 93 respectively connected to the left-side first metal contact 33 and the two horizontal metal contacts 331 and 341 by respective electric wires 71, 72 and 73. The left-side horizontal metal contact 331 and the left-side first metal contact 33 are separated from each other. The right-side horizontal metal contact 341 and the right-side first metal contact 34 are connected together. As illustrated in FIG. 7, the first terminal 91 and the second terminal 92 are electrically connected. When an AC adapter 80 is connected to the electric connector 90, the second terminal 92 is forced away from the first terminal 91 (see FIG. 8), i.e., the battery is off after installation of the AC adapter 80 in the electric connector 90. Therefore, only battery power or AC power is exclusively provided to the sealing mechanism at a time.

The aforesaid third embodiment further comprises a safety switch 60 installed in the electric wire 72 between the second terminal 92 of the electric connector 90 and the left-side horizontal metal contact 331. When not in use, the safety switch 60 is switched to off position to cut off the power supply. Under this condition, pressing the press bar 20 does not cause the sealing mechanism to work. Because the safety switch 60 can easily be achieved by conventional techniques, it is not described in detail.

Figure 9:
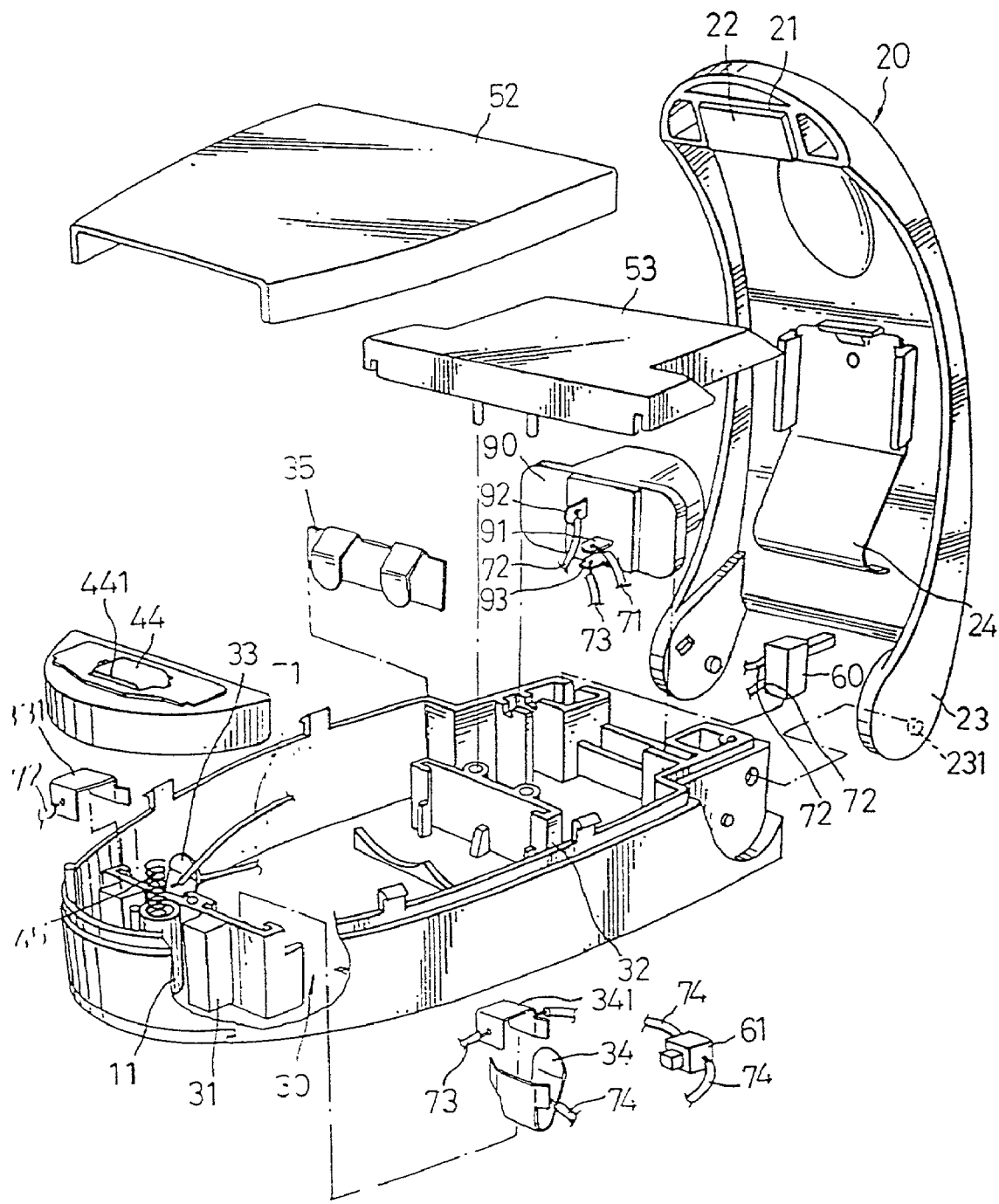
FIG. 9 is an exploded view of a hand-held electric sealer according to a fourth embodiment of the present invention.
Figure 10:
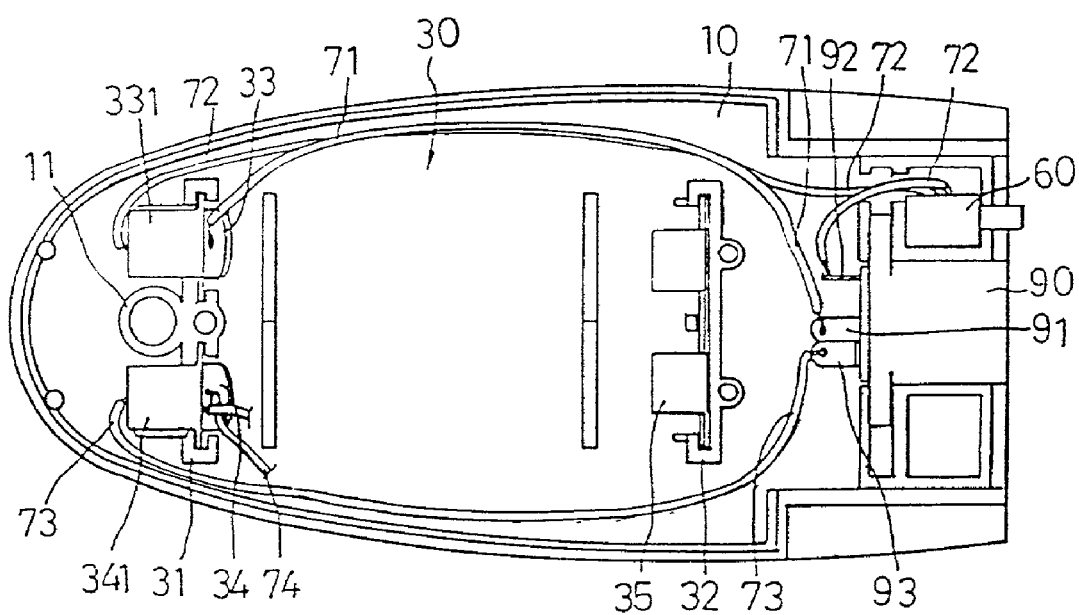
FIG. 10 is a top plain view of the fourth embodiment of the present invention, showing the arrangement of the electric circuit.

FIGS. 9 and 10 illustrate a hand-held electric sealer according to a fourth embodiment of the present invention. According to this embodiment, the right-side horizontal metal contact 341 and the right-side first metal contact 34 are separated from each other, the first terminal 91 is connected to the left-side first metal contact 33 by one electric wire 71, the second terminal 92 is connected to the left-side horizontal metal contact 331 by one electric wire 72, the third terminal 93 is connected to the right-side horizontal metal contact 341 by one electric wire 73, and the safety switch 61 is installed in an electric wire 74, which is connected between the right-side first metal contact 34 and the right-side horizontal metal contact 341.

Figure 11:
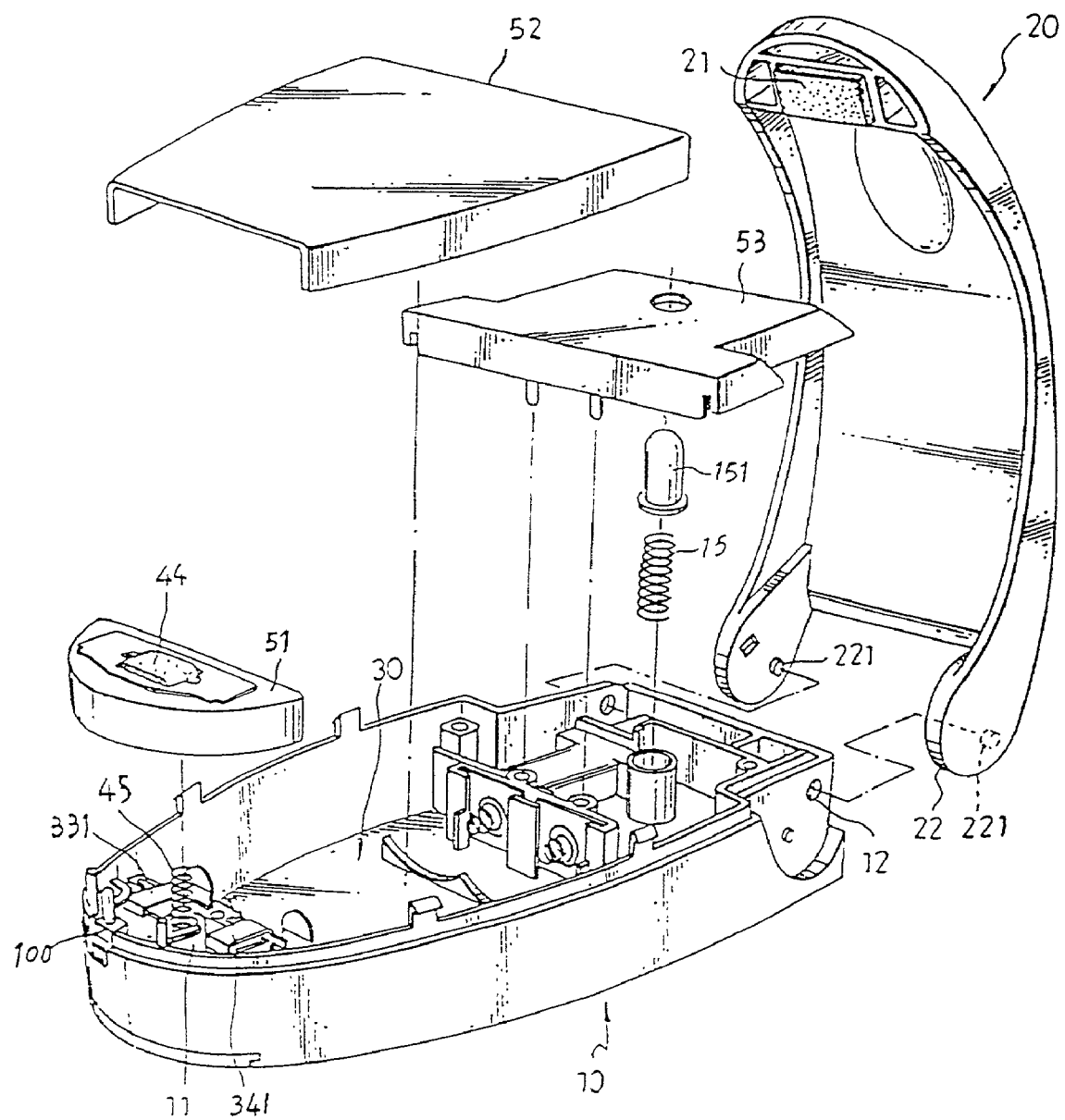
FIG. 11 is an exploded view of a hand-held electric sealer according to a fifth embodiment of the present invention.
Figure 12:
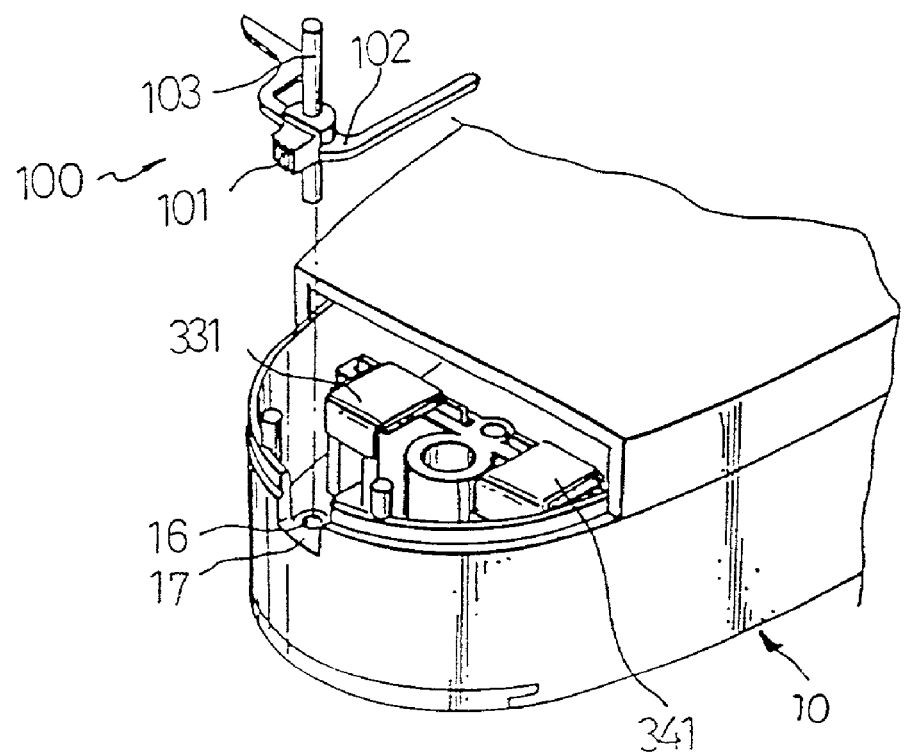
FIG. 12 is an exploded view of part of FIG. 11.
Figure 13:
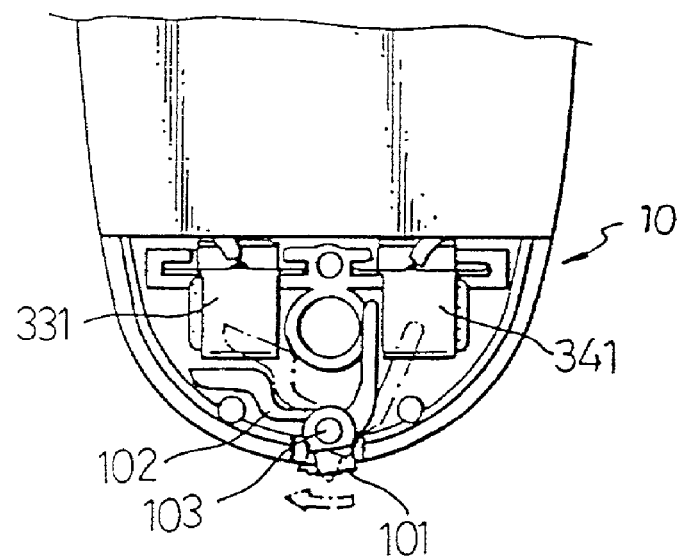
FIG. 13 is a schematic drawing showing the safety switch of the fifth embodiment of the present invention operated.

FIGS. 11 through 13 illustrate a hand-held electric sealer according to a fifth embodiment of the present invention. This fifth embodiment comprises a safety switch 100. The safety switch 100 is provided at the front side of the casing 10, comprising a knob 101, an electrically insulative stop rod 102, and a shaft 103. The shaft 103 is mounted in a hole 16 inside the casing 10. The electrically insulative stop rod 102 is a substantially V-shaped rod turned about the shaft 103. The knob 101 is fixedly connected to a part of the stop rod 102, and extended out of a top notch 17 at the front side of the casing 10. Further, a spring cap 151 is covered on a spring 15 inside the casing 10, and forced upwards by the spring 15 to support the Press bar 20 in the open position.

Referring to FIGS. 12 and 13 again, when not in use, the knob 101 is operated by hand to turn the stop rod 102 about the shaft 103 to a first position where the two opposite ends of the stop rod 102 are suspended above the horizontal metal contacts 331 and 341 to stop the metal locating plates 43 from contacting the horizontal metal contacts 331 and 341. On the contrary, when using the hand-held electric sealer, the stop rod 102 is turned about the shaft 103 to a second position where the two opposite ends of the stop rod 102 are moved away from the horizontal metal contacts 331 and 341, for enabling the metal locating plates 43 to be lowered with the sealing mechanism 30 into contact with the horizontal metal contacts 331 and 341. This safety switch 100 can be used in either of the aforesaid first, second and third embodiments, or any similar electric sealer.

Figure 14:
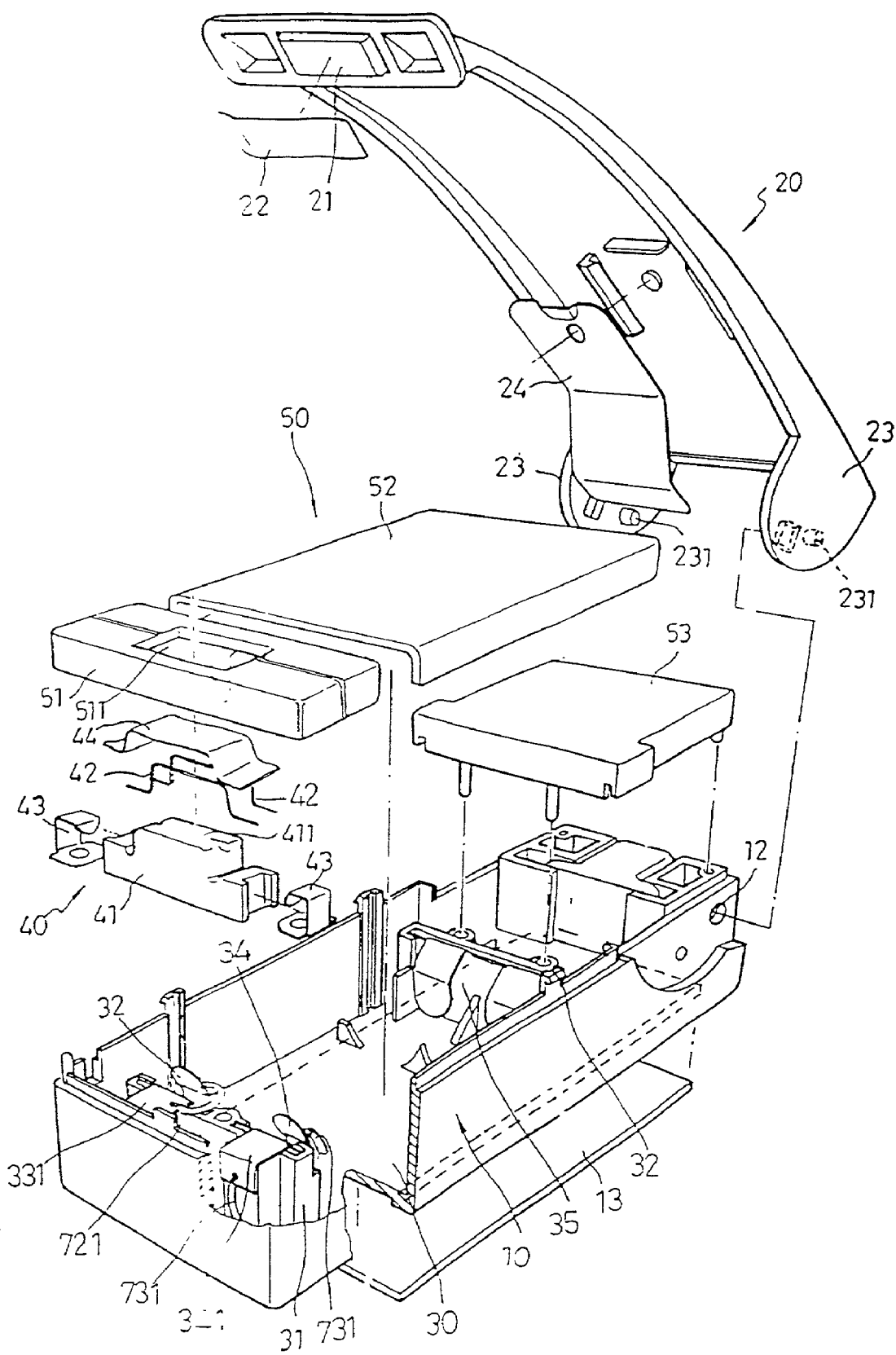
FIG. 14 is an exploded view of a hand-held electric sealer according to a sixth embodiment of the present invention.
Figure 15:
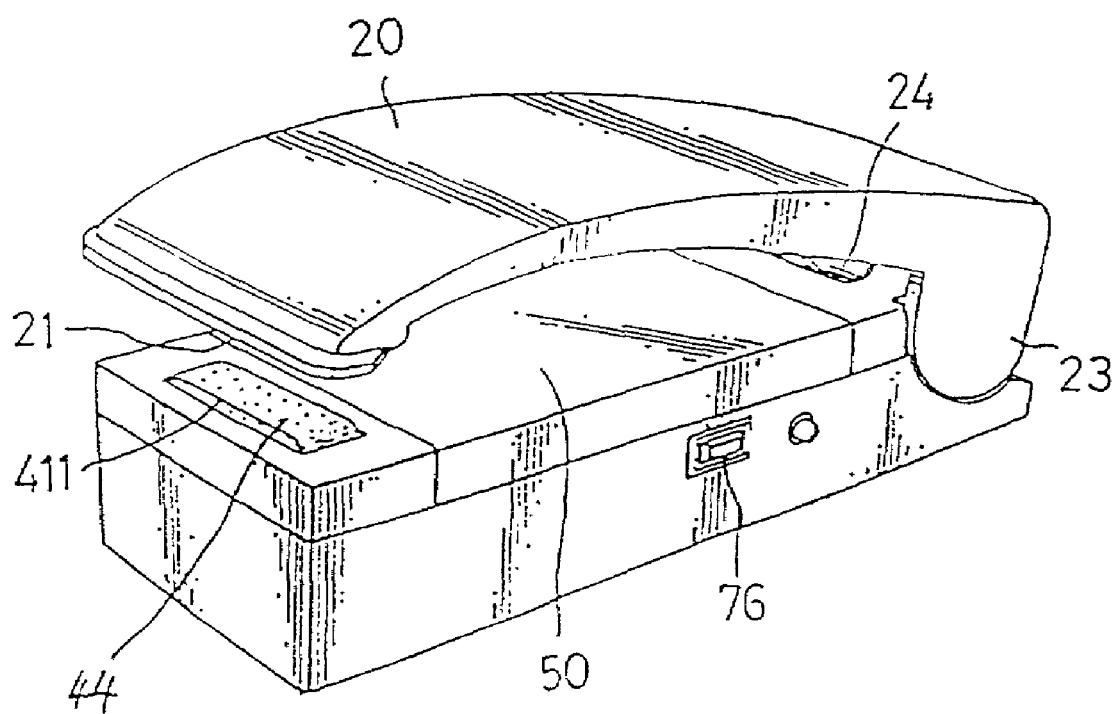
FIG. 15 is a perspective view of the sixth embodiment of the present invention.
Figure 16:
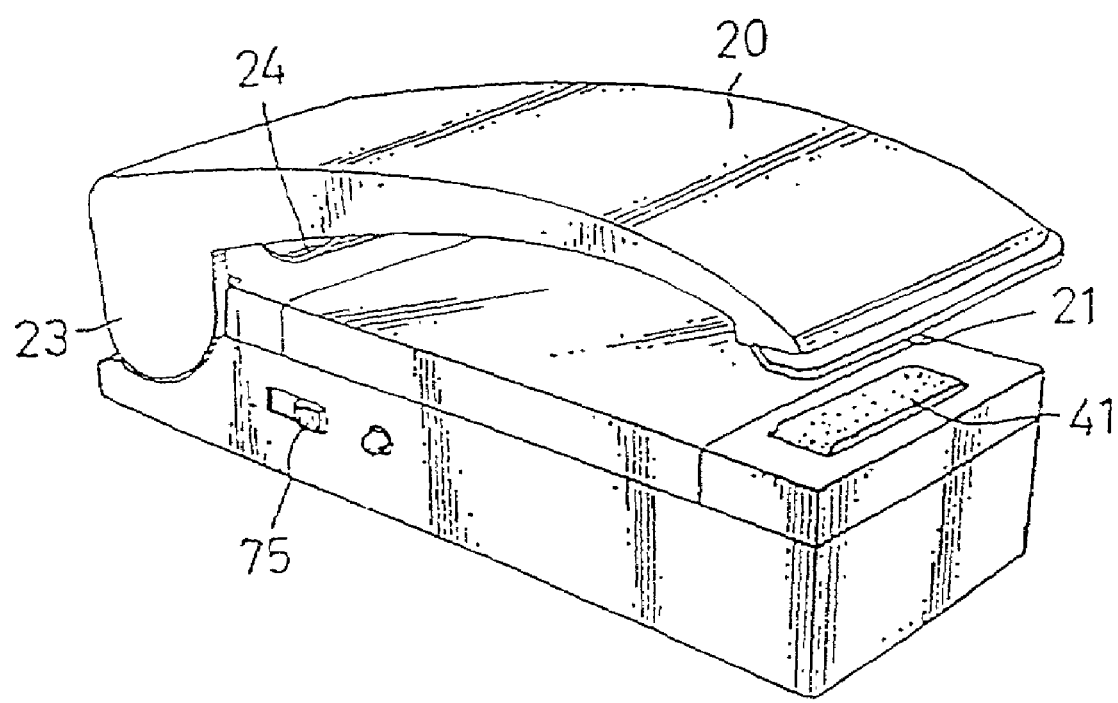
FIG. 16 is another perspective view of the sixth embodiment of the present invention when viewed from another angle.

FIGS. 14 through 16 illustrate a sixth embodiment of the present invention. According to this embodiment, the sealing mechanism is immovable, i.e., the sealing mechanism cannot be moved vertically. The hand-held electric sealer of the sixth embodiment is energizable by a battery set. According to this sixth embodiment, the sealing mechanism 40 comprises a heat insulative base 41, a heating wire 42, two metal locating plates 43, and a heat resistant cover sheet 44. When assembled, the sealing mechanism 40 is disposed above the front contact holder 31, and the metal locating plates 43 are maintained in contact with the horizontal metal contacts 331 and 341. The front cover plate 51 holds the sealing mechanism 40 in place, enabling the metal locating plates 43 to be maintained in contact with the horizontal metal contacts 331 and 341.

The aforesaid fifth embodiment further comprises a safety device, which can be a safety switch 75 or a press button switch 76. Both of the safety switch 75 and the press-button switch 76 may be simultaneously installed. In this case, the heating wire 42 can be turned on only when the safety switch 75 and the press-button switch 76 are both switched on. Referring to FIGS. 14–16 again, the left-side first metal contact 33 and the left-side horizontal metal contact 331 are separately installed and an electric wire 721 is connected between the left-side first metal contact 33 and the left-side horizontal metal contact 331. The safety switch 75 is installed in the electric wire 721 to switch on/off the circuit. Alternatively, the right-side first metal contact 34 and the right-side horizontal metal contact 341 can be separately installed and connected by an electric wire 731, and the press-button switch 76 can be installed in the electric wire 731 and controlled to close/open the circuit. If desired, the second metal contacts 35 can be separated from each other, and connected by an electric wire in which the safety switch or press-button switch can be installed and operated to close/open the circuit. The application of the safety switch and/or press-button switch can be used in the aforesaid first embodiment.

Referring to FIG. 14 again, the sealing mechanism 40 can have a plurality of heating wires 42. The cross section of the heating wire(s) 42 can have a circular shape, polygonal shape, or any of a variety of shapes.

When the safety switch 75 is switched on, the two thermoplastic flaps of the article to be sealed are put in between the heat insulative block 21 of the press bar 20 and the projecting block 411 of the heat insulative base 41 of the sealing mechanism 40, then the press bar 20 is pressed down, and at the same time the press-button switch 76 is depressed by one finger, causing the heating wire(s) 42 to produce heat, enabling the two thermoplastic flaps of the article to be sealed. When the press-button switch 76 is released, the heating wire(s) 42 is (are) off. After use, the safety switch 75 is switched off.

Figure 17:
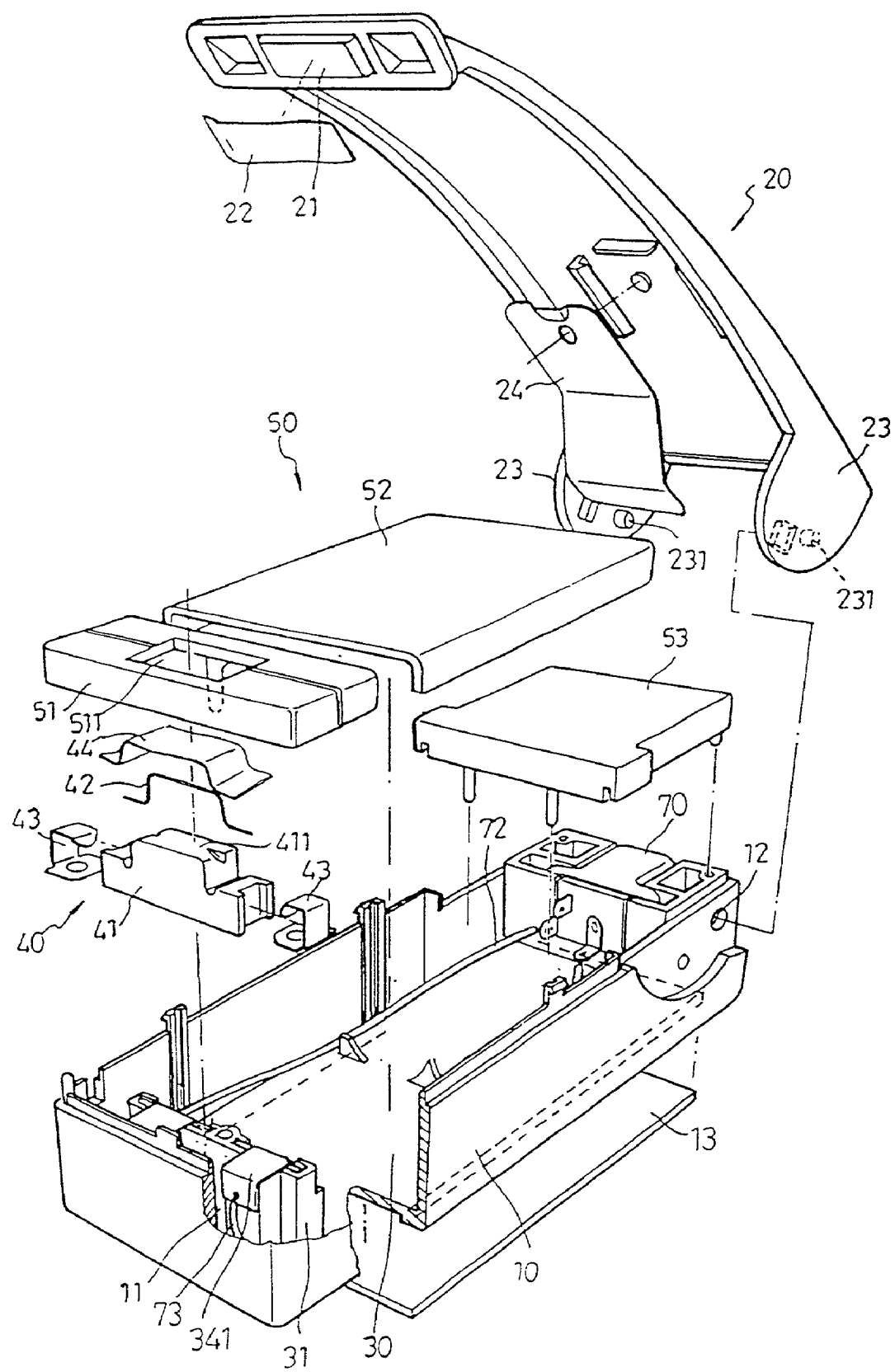
FIG. 17 is an exploded view of a hand-held electric sealer according to a seventh embodiment of the present invention.

FIG. 17 shows a seventh embodiment of the present invention. According to this embodiment, the sealing mechanism is immovable, and energizable by an AC adapter. As illustrated, a front contact holder 31, which holds two horizontal metal contacts 331 and 341, and a power socket 70 are mounted in the casing 10. The power socket 70 receives external power supply, and has two opposite terminals respectively connected to the horizontal metal contacts 331 and 341 by respective electric wires 72 and 73. The aforesaid safety switch 75 and press-button switch 76 can be selectively installed in the electric wire 72 or 73, or connected in series in the electric wire 72 or 73. Two or more safety switches or press-button switches may be installed. When a plurality of safety switches or press-button switches are installed, the sealing mechanism can be operated only when all safety switches or press-button switches are switched on. The installation and operation of the switches of the seventh embodiment may be used in the aforesaid second embodiment.

Figure 18:
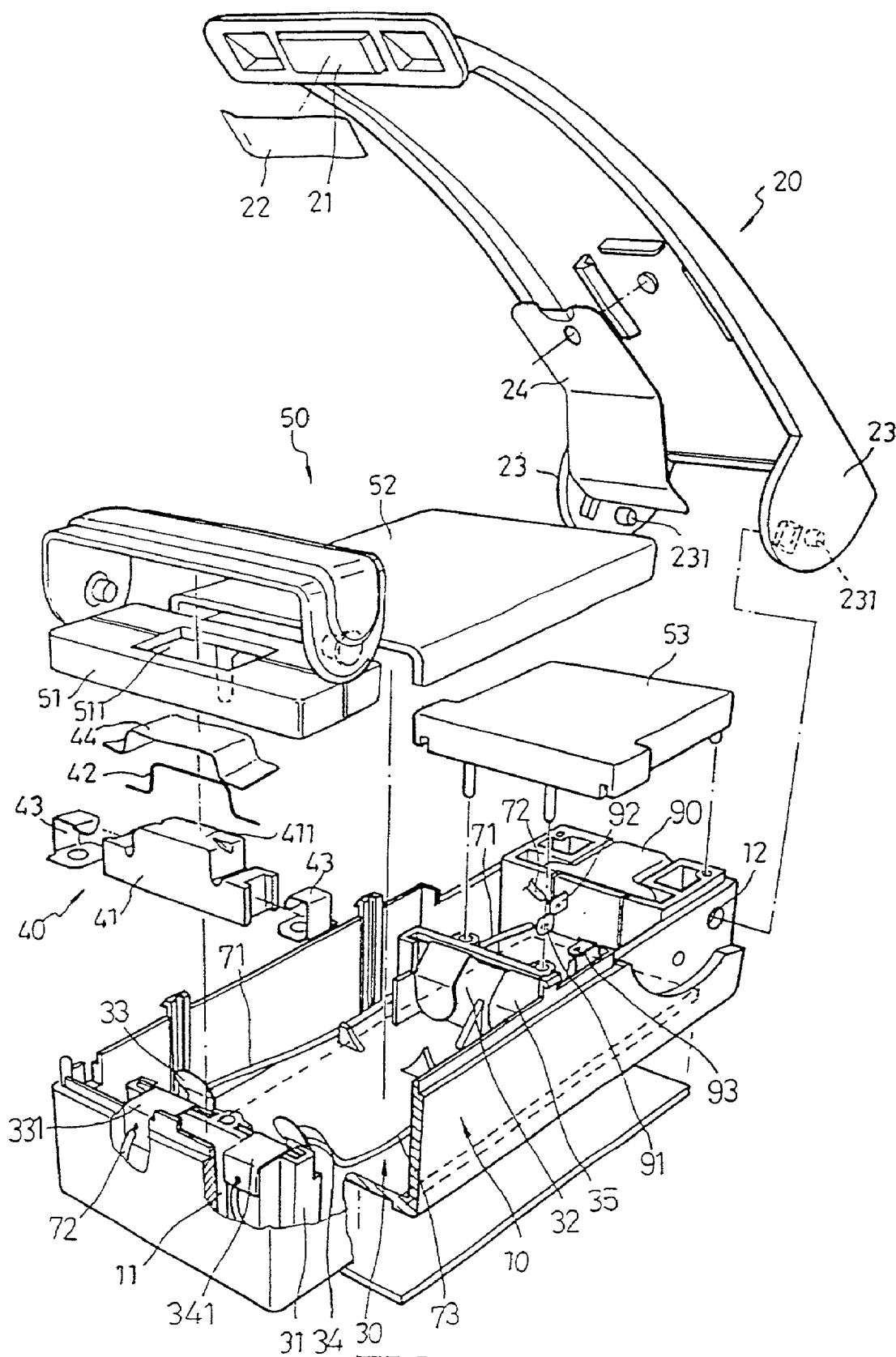
FIG. 18 is an exploded view of a hand-held electric sealer according to an eighth embodiment of the present invention.

FIG. 18 illustrates an eighth embodiment of the present invention. The sealing mechanism according to this eighth embodiment is immovable, and energizable by an internal battery set or an external AC adapter. According to this embodiment, the casing 10 comprises a battery chamber 30 for holding a battery set. The battery chamber 30 comprises a front contact holder 31 transversely disposed at a front side, a rear contact holder 32 transversely disposed at a rear side, a pair of first metal contacts, namely, the left-side first metal contact 331 and the right-side first metal contact 34 bilaterally provided at the front contact holder 31, a second metal contact 35 bilaterally provided at the rear contact holder 32, and two horizontal metal contacts namely a left-side horizontal metal contact 331 and a right-side horizontal metal contact 341 respectively disposed in contact of the first metal contacts 33 and 34. Please see also FIG. 8, an electric connector 90 is mounted in the casing 10. The electric connector 90 comprises a first terminal 91, a second terminal 92, and a third terminal 93. The terminals 91, 92 and 93 are respectively connected to the left-side first metal contact 33, the left-side horizontal metal contact 331 and the right-side horizontal metal contact 341 by electric wires 71, 72 and 73. Before the installation of an AC adapter 80 in the electric connector 90, the first terminal 91 and the second terminal 92 are electrically connected. When an AC adapter 80 is connected to the electric connector 90, the second terminal 92 is forced away from the first terminal 91, i.e., the battery is off after installation of the AC adapter 80 in the electric connector 90. Therefore, only battery power or AC power is exclusively provided to the sealing mechanism at a time. A safety switch and a press-button switch (not shown) can be connected in series, and installed in the electric wire 72. Alternatively, a safety switch and a press-button switch may be connected in series, and installed in the position corresponding to the position of the safety switch 61 of the aforesaid fourth embodiment. The operations of the sealing mechanism, the safety switch and the press button switch are similar to the aforesaid sixth and seventh embodiments.

Figure 19:
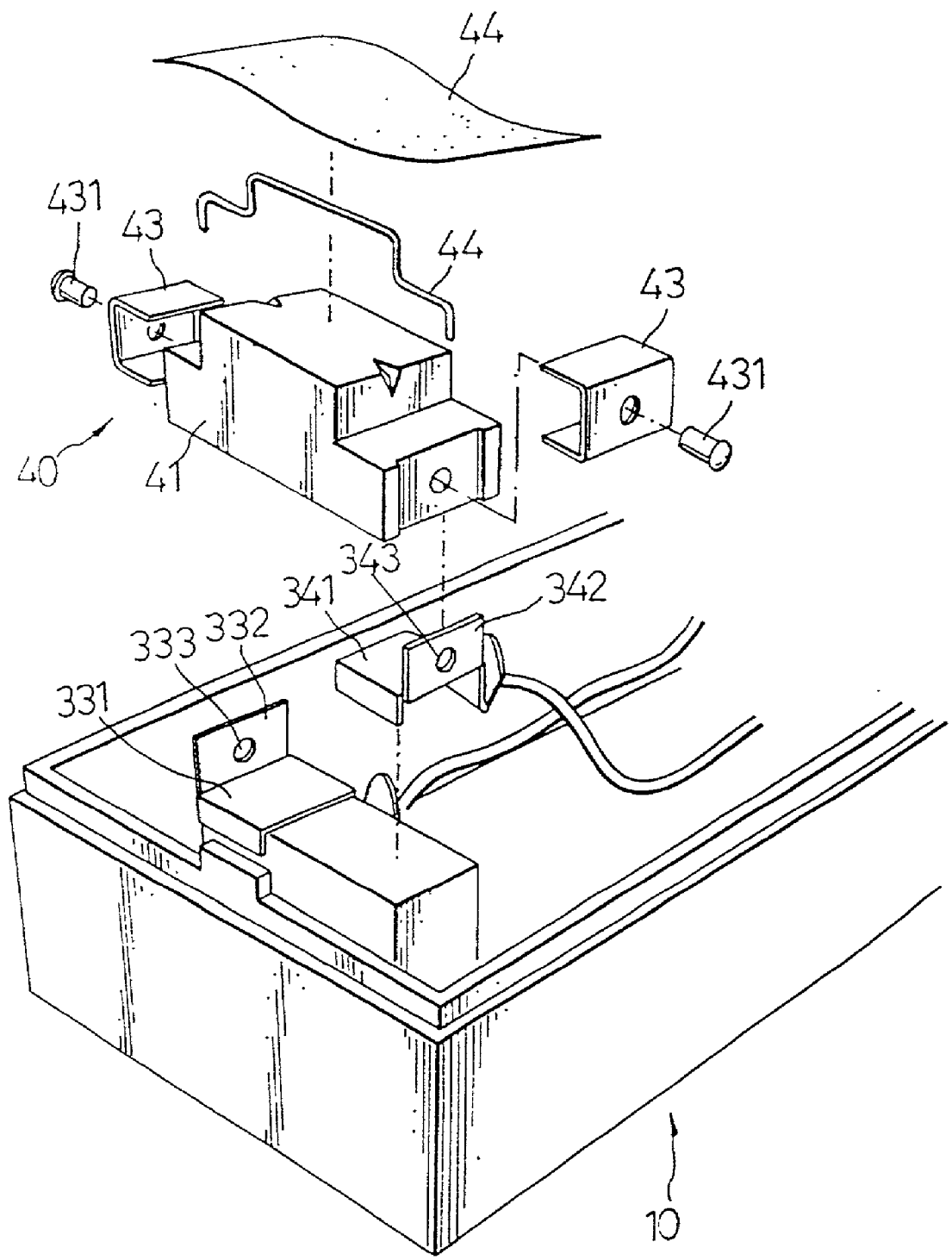
FIG. 19 is an exploded view showing the detachable arrangement of the sealing mechanism according to the present invention.

Referring to FIG. 19, the sealing mechanism can be made detachable. As illustrated, the horizontal metal contacts 331 and 341 each have an upright lug 332 or 342, which has a locating hole 333 or 343. The metal locating plates 43 of the sealing mechanism 40 each have a bolt 431 at an outer side. By inserting the bolts 431 of the metal locating plates 43 into the locating holes 333 and 343 at the metal contact plate 331 and 341, the sealing mechanism 40 is coupled between the horizontal metal contacts 331 and 341. Because the sealing mechanism 40 is detachable, it can be replaced with a new one when its heating wire or heat resistant cover sheet is damaged.

Figure 20:
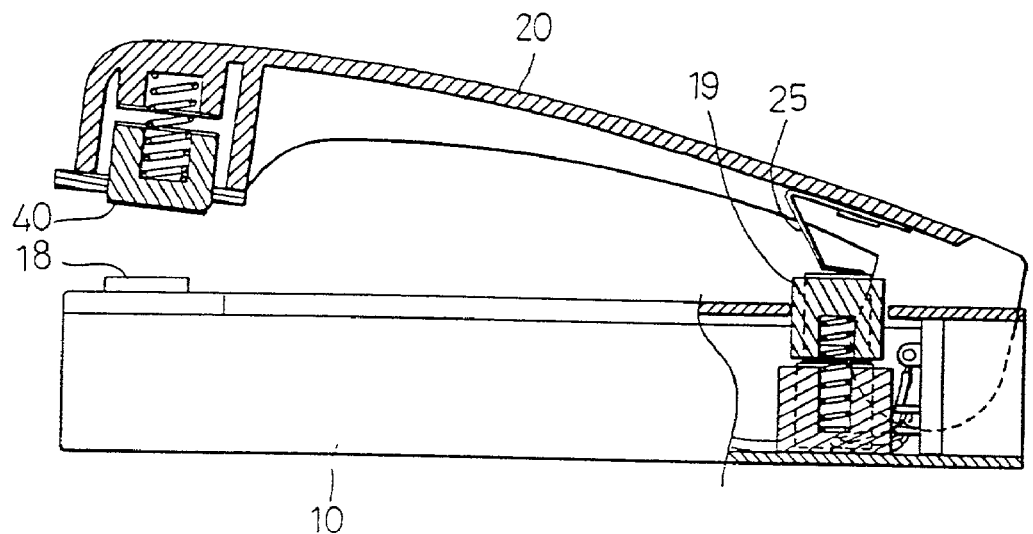
FIG. 20 is a sectional view of an alternate form of the present invention, showing the sealing mechanism installed in the free end of the press bar.
Figure 21:
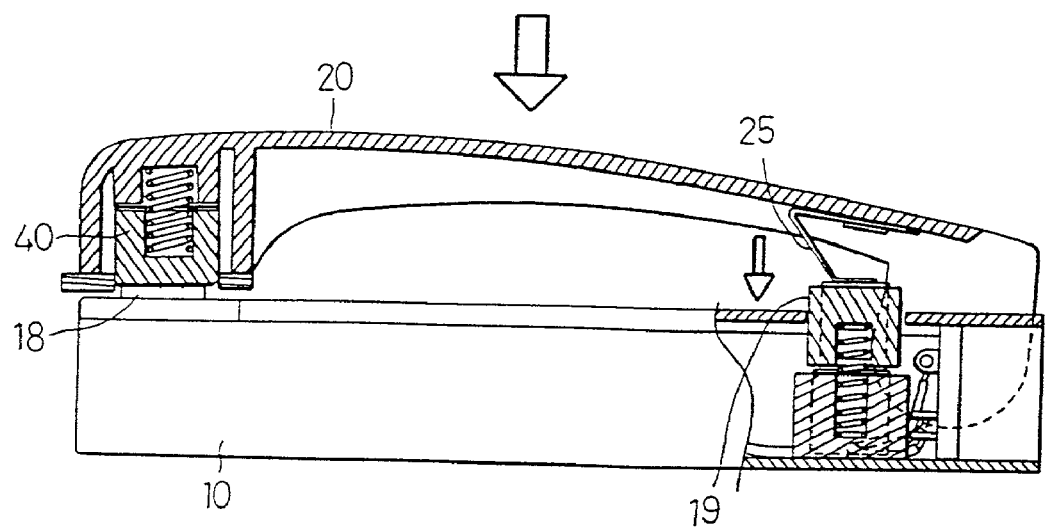
FIG. 21 is similar to FIG. 20 but showing the press bar depressed.

Referring to FIGS. 20 and 21, the sealing mechanism 40 can be installed in the free end of the press bar 20. As illustrated, the press bar 20 comprises two metal press plates 25 respectively connected to the sealing mechanism 40. The casing 10 comprises a heat insulative block 18 at the top corresponding to the sealing mechanism 40 at the press bar 20. A switch 19 is installed in the casing 10, and controlled to turn on/off the sealing mechanism 40. When the press bar 20 is pressed down to force the sealing mechanism 40 against the heat insulative block 18, the metal press plates 25 are simultaneously pressed on the switch 19, causing the switch 19 to be switched on, and therefore the electric circuit is closed, enabling electricity to be transmitted to the sealing mechanism 40. In FIGS. 20 and 21, the sealing mechanism 40 is movably provided at the free end of the press bar 20 (the sealing mechanism 40 is coupled to the free end of the press bar 20 and supported on a spring member). Alternatively, the sealing mechanism 40 can be fixedly secured to the free end of the press bar 20.

The design of arranging the sealing mechanism at the press bar can be used in any of a variety of hand-held electric sealers, including battery-operated electric sealers, AC electric sealers. AC/DC dual mode electric sealers.

It is to be understood that the drawings are designed for purposes of illustration only, and are not intended as a definition of the limits and scope of the invention disclosed.

The invention claimed is:

1. A hand-held electric sealer comprising
a) a housing,
b) a press bar having a free end, said press bar being pivotally connected to said housing,
c) a metal press plate remote from said free end of said press bar for normally biasing said press bar in an open position, wherein said metal press plate is secured to said press bar,
d) a heating unit,
e) a source of current, and
f) circuitry electrically connecting said heating unit and said source of current, wherein said circuitry is normally in an open state,
wherein when said free end of said press bar is pivoted downwardly said metal press plate switches said circuit from an open state to a closed state.

* * * * *